Oct. 17, 1933.  J. D. RYDER  1,931,474
MEASURING AND CONTROLLING APPARATUS
Filed April 14, 1932
Fig.1
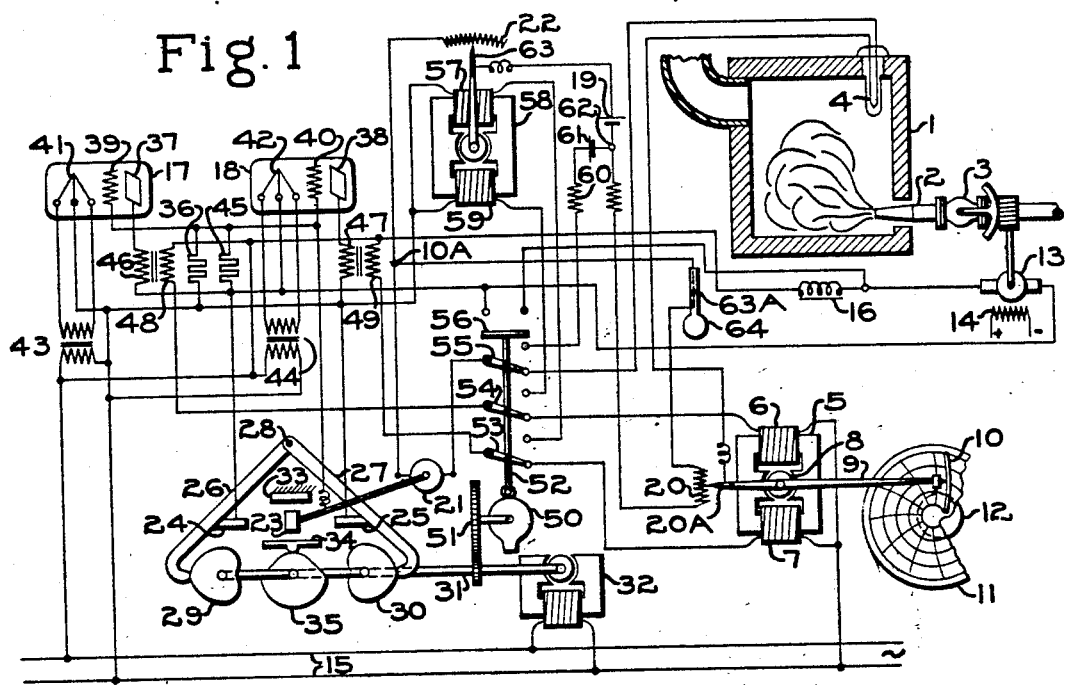
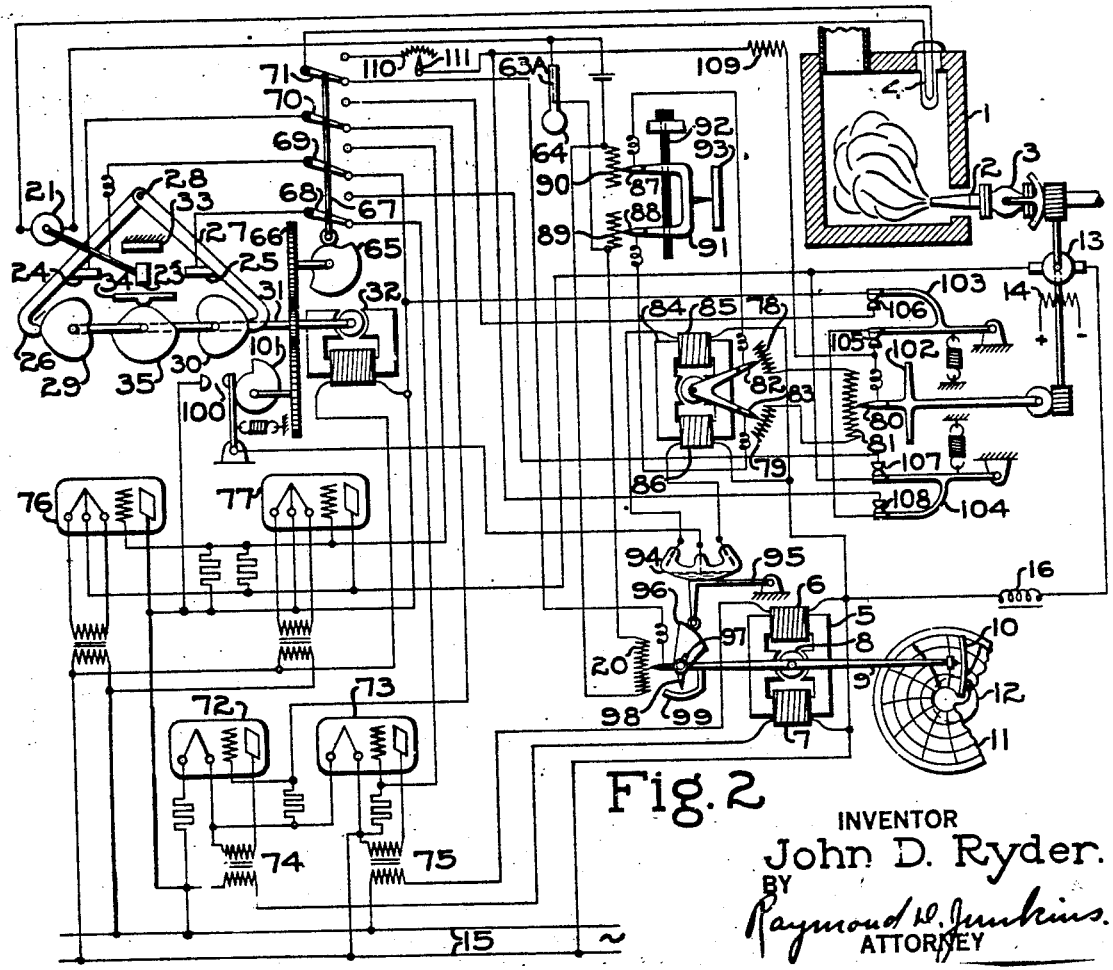
Fig.2
INVENTOR
John D. Ryder.
BY
Raymond W. Jenkins
ATTORNEY Patented Oct. 17, 1933

1,931,474

UNITED STATES PATENT OFFICE 1,931,474

MEASURING AND CONTROLLING APPARATUS

John D. Ryder, Cleveland, Ohio, assignor to Bailey Meter Company, a corporation of Delaware Application April 14, 1932. Serial No. 605,269

REISSUED

26 Claims. (Cl. 236—70)

The present invention relates to apparatus for measuring and/or controlling the magnitude of a variable and particularly such variable conditions as temperature, pressure, rate of fluid flow, etc., although the variable may be of any chemical, electrical, thermal, physical or other nature or characteristic.

According to the invention, I produce an electrical effect varying in known proportion to the magnitude of a variable condition whose magnitude or variation from predetermined value I desire to measure or control. Such electrical effect may be a small force such as an electromotive force produced by a thermocouple and may be magnified to any desired degree to perform useful work. The electrical effect may be representative of the difference in magnitude of two independent variables whereby the magnitude of one of the independent variables may be determined and/or controlled.

One object of the invention is to provide apparatus and arrangement of the character referred to wherein the deflections of a galvanometer or other sensitive device may be utilized in the control of amplified power to stop, start or reverse either direct current motors or alternating current motors, or the two simultaneously.

Another object of the invention is to provide for the simultaneous indication of the value of a variable condition along with a control of the magnitude of the condition.

A further object is to provide for alternately controlling and recording or indicating the magnitude of a variable condition, and wherein one result may be accomplished with a direct current motor and the other result with an alternating current motor.

A still further object relates to apparatus whereby the regulating means for control of the variable may be positioned over a predetermined range in magnitude of the condition while the recording or indicating means may be sensitive to variations in magnitude of the condition of greater or lesser extent.

Still another object is to effect the control of the variable condition, not only in accordance with the departure in magnitude of the variable from a predetermined value but also in the departure in value for any period of time from the value at a predetermined period of time.

Still another object is to arrange for the deflecting or sensitive instrument, such as a galvanometer, to be made less sensitive to variations in electrical potential over a predetermined range than over another predetermined range.

Still further objects of the invention will become apparent from the drawing and the description relating thereto in connection with preferred embodiments which I have chosen as representative and wherein variable temperature in the operation of a heating furnace is measured and controlled either simultaneously or successively.

In the drawing:

Fig. 1 is a diagrammatic arrangement of apparatus and electric circuit embodying the invention in connection with the measurement of a temperature of a furnace and the control simultaneously therewith and therefrom of supply of fuel to the said furnace.

Fig. 2 is a diagrammatic arrangement of apparatus and circuit embodying a modification of the arrangement of Fig. 1.

Referring first to Fig. 1, I therein illustrate an embodiment of my invention wherein the temperature of a metallurgical heating furnace 1 is measured for instantaneous reading on an index and for recording upon a continuous record chart. Furthermore, from such temperature evaluation and its relation in magnitude to a predetermined value which is desirably to be maintained in the furnace, I effect a control of the supply of fuel fed to the furnace 1 through a burner 2 by throttling or controlling the throttled position of a valve 3 located in the fuel oil supply line before the burner 2. The air for combustion enters the furnace around the burner 2. At 4 I indicate a thermocouple located sensitive to temperature within the furnace and which temperature is to be indicated and controlled.

Primarily, when there is a deviation in temperature within the furnace, a potential relation in the thermocouple circuit is disturbed and from such lack of balance a periodically actuated feeler mechanism cooperates with electrical magnification means for effecting the positioning simultaneously of an alternating current motor to advise the value of the temperature, and a direct current motor to control fuel admission to the furnace.

The use of thermocouples for the measurement of relatively high temperatures is well known in the art and it is equally well known that the electrical effect obtained thereby is minute and must, of necessity, be amplified mechanically and/or electrically to do useful work, such as recording, indicating or controlling. My invention, in general, contemplates improved electrical circuits and apparatus in combination for causing a substantial amplification of the electrical effect of the thermocouple, sensitive to and representative of the temperature within the furnace, and where such amplification may be utilized for remotely or locally recording, indicating and/or controlling variable factors in the operation of the furnace.

I have illustrated the thermocouple 4 as having its hot junction located within the furnace. By the term "hot junction" it is to be understood that I mean that junction of the thermocouple which is exposed to the temperature it is desired to evaluate regardless of whether that temperature is of a greater or lesser magnitude than the room or reference temperature to which the other junction of the thermocouple circuit is normally exposed, and which I term for simplicity the "cold junction".

The electrical effect obtained through the thermocouple 4 indicative of variations in the temperature within the furnace, is utilized in a potentiometer circuit, as will be explained hereinafter, for positioning of the sensitive galvanometer. A mechanically periodically-actuated feeling device cooperates with the galvanometer needle for the control upon departure of temperature from predetermined value, of thermionic or electron discharge devices whereby the minute electrical effect is amplified or magnified. The magnified effect then controls electromagnetic devices, such as motors, which are utilized as amplified power means for positioning indicator and recording members of the temperature and also positioning the control valve 3.

I show at 5 a motor having opposed windings, 6 and 7, connected in an alternating current circuit and opposedly wound in a manner such that when the windings 6 and 7 are equally energized, a rotor 8 is not urged to rotation in either direction; but when the windings are unequally energized, rotation of the rotor 8 will occur in predetermined direction. Carried by the rotor 8 for angular positioning thereby, is an indicator arm 9 adapted to cooperate with an index 10 and comprising a marking means arranged to form a continuous record upon a chart 11, driven at a uniform speed by a clock motor 12. The assembly comprising the motor 5 and indicating-recording means is adapted to advise the value of the temperature at which the thermocouple 4 is sensitive.

Upon every change in temperature at the thermocouple 4, I effect an angular displacement of the rotor 8 directly proportional to the variation in the thermocouple potential through substantially de-energizing one or the other of the field windings 6, 7 in a manner to be explained.

Further responsive to temperature at the thermocouple 4, connected for operation in parallel with the motor 5, I show a motor 13 for positioning in desired direction and amount the fuel control valve 3. The motor 13 has a separately excited direct current field 14 and a wound rotor armature connected in an alternating current circuit. The motor 13 with the control circuit arrangement for starting, stopping and reversing its rotation has been disclosed and claimed by me in my co-pending application, Serial No. 561,005, filed in the United States Patent Office September 3, 1931.

Briefly, the armature 13 is normally stationary and not urged to rotation in either direction, through the application thereto of equal opposing torques comprising the alternate half cycles of an alternating current wave; the armature being normally connected in an alternating current circuit. I effect rotation in one direction or the other through the releasing from the armature of one of the opposing torques whereby the application to the armature of the remaining torque comprising a pulsating direct current in one direction, causes rotation in the desired direction. When the armature is rotating through the impulse of pulsating direct current in a given direction, and it is desired to stop rotation of the armature, I apply to the armature the other half of the alternating current wave whereby an equal opposing torque plus the counter emf is substantially instantaneously applied to the armature, effecting a substantially instantaneous stoppage of rotation thereof, and whereafter the armature is not urged to rotation in either direction until one or the other of the half wave pulsating direct current forces is released.

The armature 13 is connected at one terminal directly with an alternating current power source 15 through a current limiting reactor 16 of the closed core type, and at the other terminal in series with a pair of thermionic electron discharge devices 17, 18 opposedly connected in parallel with each other but as a pair in series between the power source 15 and the armature 13.

The reactor 16 allows full wave alternating current to be impressed across the armature 13 without burning the same. While the electron discharge devices 17, 18 each pass to the armature one half of the alternating current wave comprising a pulsating direct current and being opposedly connected in parallel when both of the devices are conducting, there is applied to the armature full wave alternating current. The present embodiment of my invention contemplates a control of the devices 17, 18 for allowing either or both to be conducting whereby the motor 13 is allowed to rotate in desired direction or to be unurged to rotation.

It will be observed that the arrangement is such that when temperature at the thermocouple 4 varies, an electromotive force of minute value will be set up in the thermocouple circuit which, through proper means to be hereinafter described, I amplify for the control of rotation in amount and direction of the motors 5 and 13 simultaneously and in parallel for indicating and recording the temperature in the furnace, as well as controlling the fuel supply valve 3, to maintain such temperature substantially uniform.

In connection with the thermocouple 4 and the motors 5, 13, I utilize a single galvanometer and feeler device whereby I periodically determine, through the departure of the galvanometer needle from neutral position, a change in magnitude of the temperature of the furnace, and upon finding that the needle has departed in one direction or the other from neutral position, I cause a positioning of the rotor 8 or the rotor 13 for indicating and recording the new temperature and through the valve 3 controlling the fuel supply to the furnace, to tend to return the temperature to predetermined value.

In the circuit of the thermocouple 4 I utilize the well known zero balance or null method. In accordance with this method, the potential developed by the thermocouple is balanced against the fall of potential through a portion of a slide wire potentiometer or resistance of known length and value per unit of length. Upon a change in potential developed by the thermocouple, a galvanometer in the circuit indicates by its needle swing a departure from balance and effects indirectly a movement on the slide wire potentiometer whereby a zero balance of potential is effected. The physical position of the contact point of the slide wire potentiometer may be further utilized as an indication of temperature equivalent to the potential across the thermocouple.

Such, in general, is the system which I employ. A constant drop in potential is maintained across the slide wire potentiometer resistance by means of a suitable current source and it is evident that the amount or length of resistance necessary to balance the potential generated by the thermocouple will then be proportional to that potential and may, by suitable calibration, be used to determine its magnitude and, correspondingly, the magnitude of the temperature to which the thermocouple is sensitive. In Fig. 1 I provide such a potentiometer circuit, essentially comprised of a current source battery 19 connected in series with a slide wire potentiometer 20. A galvanometer, diagrammatically indicated as 21, is connected in series with thermocouple 4 and they together span that part of the potentiometer circuit between contact arm 20A and a variable resistance 22 later to be described. The contact arm 20A comprises an extension of the indicator arm 9, insulated therefrom and adapted to frictionally engage along the slide wire resistance 20 upon angular positioning of the rotor 8. When the difference in potential through that part of the potentiometer circuit between the arm 20A and the variable resistance 22 is equal to that developed by the thermocouple 4, the galvanometer needle 23 will remain stationary midway between two movable contacts 24 and 25 as shown.

Upon a variation in temperature within the furnace, resulting in a corresponding increase or decrease in the potential difference developed by the thermocouple 4, the galvanometer needle 23 will be deflected either to the right or to the left on the drawing an amount substantially proportional to the variation in temperature. Upon such a deflection of the galvanometer needle, periodically engagement will be made between the galvanometer needle and either the contact 24 or the contact 25, with the result that rotation of the rotor 8, and simultaneously of the rotor 13, will be effected in the proper direction to move the indicator 9 to read the new temperature, to position the fuel supply valve 3 for variation in the supply of fuel, and to move the contact arm 20A along the slide wire resistance 20 until the difference of potential through that part of the potentiometer circuit between the contact arm 20A and the variable resistance 22 is again equal to that developed by the thermocouple. It is evident that the amount of movement of the arm 20A will then be proportional to the change in temperature within the furnace and accordingly a true indication of the new temperature will be accomplished on the chart 11, and relative to the index 10, through movement of the indicator marker 9. Simultaneously, the supply of fuel to the furnace will have been varied an amount in direction whereby the heating of the furnace will be corrected to tend to return the temperature at the thermocouple 4 to predetermined desirable value.

I show diagrammatically in the drawing the mechanism through whose agency I am enabled to periodically transmute the mechanical manifestation of the galvanometer needle of changes in potential generated by the thermocouple connected thereto, into electrical manifestation of constant magnitude, but which continue for an increment of time proportional to the mechanical manifestation of the galvanometer needle. This feeler mechanism is more generally described, illustrated and specifically claimed in my co-pending application, Serial No. 605,268, filed of even date herewith and having the same assignee. The electrical manifestation so obtained I then use to control the energization of the motors 5 and 13.

Referring to the diagrammatic illustration of Fig. 1, members illustrated as scissor bars 26 and 27, both pivoted at 28, are periodically moved toward and away from each other by the agency of similar but oppositely positioned cams 29, 30 rigidly attached to a shaft 31 rotated at constant speed by a continuously operating motor 32. The scissor bars 26, 27 are provided at their lowermost ends with rollers, the one riding the surface of the cam 29 and the other the surface of the cam 30, and the scissor bars further carry, respectively, the contacts 24, 25 insulated therefrom and from each other.

The galvanometer 21 as shown is of the suspended type and properly located relative to a permanent magnet in known manner. Normally, the needle 23 of the galvanometer is free to deflect in accordance with the difference of potential generated by the source to which the galvanometer is connected and that portion of the potentiometer circuit spanned. Periodically, however, the needle 23 is clamped between a stationary portion 33 and a movable bar 34 which is reciprocated by means of a constantly revolving cam 35 secured to the shaft 31. Thus, periodically upon each revolution of the cam 35 the needle 23 will be clamped lightly between the stationary member 33 and the movable reciprocating bar 34, and for a portion of each revolution of the cam 35.

Immediately after the needle 23 has been so clamped, the position of the cams 29, 30 relative to the cam 35, is such that the scissor arms 26, 27 move toward each other. When, as shown, the galvanometer needle 23 is in mid-position, indicating a balance between the two potentials, the scissors arms 26, 27 will follow the complete periphery of the cams 29, 30 and neither the contacts 24, 25 will engage the needle 23. However, if the needle is deflected through action of the galvanometer 21, either to the right or to the left, then the adjacent scissors arm will follow the periphery of the associated cam until the contact carried by the scissors arm reaches the needle. Further motion of this scissors arm toward the other will then be prevented by the galvanometer needle and the engaged contact will remain in engagement with the needle until the scissors arm is again picked up by the associated cam and moved away. At a predetermined definite point in the outward travel of the scissors arms, the galvanometer needle 23 will be released from clamping engagement and be free to deflect either further away or return toward the predetermined neutral position and until it is again clamped as the scissors arms travel toward each other on the next cam cycle of revolution.

It is evident that by proper shaping of the cams 29, 30 the length of time the scissors arms are in contact with the needle 23, may be made directly proportional to the amount of deviation of the needle from mid-position, which in turn is proportional to the difference of the opposed potential. If desired, one of the cams, for example 29, may be made of a different shape than the other cam, for example 30, whereby the length of contact for a given deflection of the galvanometer needle in one direction may be made different from that for the same amount of deflection of the galvanometer needle in the opposite direction. It is further evident that the cams 29, 30 may be made of any desired shape so that the length of engagement between the contacts carried by the scissors arms and the galvanometer needle will bear any desired functional relation to the amount of deviation from the neutral or mid-position of the galvanometer needle.

I utilize the feeling and clamping apparatus just described to produce an electrical effect bearing definite relation to the departure of the galvanometer needle from neutral position and for the control of operation of motors 5 and 13. Intermediary between the feeler apparatus and the motors mentioned and controlled by a minute electrical force originated through engagement of the galvanometer needle 23 with either the contact 24 or the contact 25, I interpose electron discharge devices or thermionic valves 17, 18 for controlling an amplified or substantially greater electrical force to be directly applied to the motors mentioned. Certain features of the motor control circuit including the electron discharge devices are described and claimed in my co-pending application, Serial No. 605,267 filed of even date herewith and having the same assignee. I will now explain the functioning of this apparatus in sufficient detail to be understandable in conjunction with the present application, although it will be understood that the arrangement is illustrated and described in greater detail in the aforementioned co-pending application.

The galvanometer needle 23 is connected directly to one side of the alternating current source 15 through a suitable resistor 36. The discharge devices 17, 18 are provided with anodes 37, 38, grids 39, 40 and cathodes 41, 42, respectively. A source of current for heating the cathodes 41, 42 is provided by the secondaries of the transformers 43, 44 which are connected across the alternating current source 15. Devices 17, 18 as previously mentioned are connected oppositely in parallel with each other; that is, the anode 37 is connected to the cathode 42, while the anode 38 is connected to the cathode 41.

Grids 39, 40 are connected together and maintained at a normal potential relation with respect to the cathodes 41, 42 by suitable impedance devices herein shown as resistors 36 and 45. The potential relation maintained by the resistors 36, 45 is such that during a half of the alternating current cycle, the device 17 will transmit current through its output circuit, and during the alternate half of the alternating current cycle the device 18 will transmit current in the opposite direction through its output circuit. Normally, therefore, an alternating current will be impressed upon the armature 13 which is connected across the power source 15 in series with the parallel connected devices 17, 18.

If one or the other of the devices 17, 18 is not conducting, then a pulsating direct current of one direction will be impressed upon the armature 13 which will rotate in predetermined direction. Control of the devices 17, 18 as to whether or not they are individually conducting, is embodied in a control of the potential relation between the grid and cathode of the respective device, and such potential relation between the grids 39, 40 and the respective cathodes 41, 42 is determined by the resistors 36, 45. If the grid is sufficiently negative relative to its related cathode, it will not conduct and no current flow will take place unidirectional from the anode to the cathode, comprising through that device a pulsating direct current of predetermined direction and potential.

During the increment of rotation of the cams 29, 30 when the galvanometer needle 23 is in engagement with either the contact 24 or the contact 25, the normal potential relation existing between the grid and cathode of each thermionic device is modified so that for that increment of time one or the other of the discharge devices will be non-conducting, depending upon whether the needle is in engagement with the contacts 24 or 25. This is accomplished by connecting the galvanometer needle to the grids 39, 40, the contact 24 to the cathode 42 and the contact 25 to the cathode 41. Due to the relatively high values of the resistances 36, 45, when the galvanometer needle is in engagement with the contact 24 a potential substantially equal to that of the cathode 42 will be impressed upon the grids 39, 40 which will render the discharge device 18 non-conducting during that portion of the alternating current cycle in which it was normally conducting previously. The discharge device 17 will, however, remain conducting through one-half of the alternating current cycle as the potential of the grid 39 will be positive with respect to the cathode 41 when the anode 37 is positive. When the galvanometer needle is in engagement with contact 25, a similar action takes place wherein the discharge device 17 will be non-conducting throughout the full alternating current cycle.

Now, as explained hereinbefore and more in detail in my co-pending application, when one of the devices 17 or 18 is non-conducting, a unidirectional or pulsating direct current from the conducting device will be impressed across the rotor 13 whereby the rotor will rotate in predetermined direction for a control of the fuel supply valve 3. Such rotation will continue so long as one of the devices 17, 18 remains non-conducting, but the rotation will stop substantially instantaneously as soon as both the devices 17, 18 are made conducting, each for a half cycle of the alternating current wave. Inasmuch as the devices 17, 18 are oppositely connected in parallel and in series with the armature 13, there is applied to the armature 13 a unidirectional pulsating direct current from one of the devices in a direction to cause rotation in one direction, and from the other device in a direction to cause rotation in the opposite direction. When both of the devices are conducting, a full wave alternating current is impressed across the armature 13 and the equal opposing torques tend to cancel, with no urge to rotation of the armature.

A feature of the invention resides in the fact that simultaneously with the control of the motor 13, I have provided a control of the motor 5 whereby the pulsating direct current passing through the output circuits of the discharge devices 17, 18 is effective for controlling the operation of the self-starting reversible alternating current motor 5. Connected in series with the anodes 37, 38 are the saturating coils 46, 47 of saturable core reactors whose associated coils 48 and 49, respectively, are connected in series with the opposed fields 6 and 7 of the motor 5 across the power source 15.

When the thermionic discharge devices 17, 18 are both conducting currents, then, due to the well known characteristics of the saturable core reactors, the impedance of the windings 48, 49 will be of a sufficiently low magnitude to permit normal and equal energization of the fields 6, 7 whereby the rotor 8 will be not urged to rotation. When, however, either the device 17 or the device 18 is rendered non-conducting, as previously explained, then the impedance of the saturable coil reactor having its saturating winding connected in series with the anode of the discharge device, will be increased to such a magnitude as to substantially de-energize the field of the motor connected in series therewith. This unbalance of energization of the fields 6, 7 will allow rotation of the rotor 8 in predetermined direction for movement of the indicator arm 9 and the slide wire resistance contact arm 20A.

In operation when, as shown, the thermocouple potential is equal to that of the potentiometer circuit or the two are in balance, the galvanometer needle will be in its neutral or mid-position. The thermionic discharge devices 17, 18 will each conduct alternate half cycles of the alternating current wave, the complete cycle of which will be impressed upon the armature 13, whereby the armature will be not urged to rotation and will remain stationary. The pulsating direct current in the output circuit of the devices 17, 18 will be of sufficient magnitude to maintain the impedance of the saturable coil reactors 48, 49 at a sufficiently low value so that the fields 6, 7 of the motor 5 will be normally energized, thereby balancing opposed forces so that the armature 8 is not urged to rotation. Upon a decrease in temperature, for example, within the furnace, the galvanometer needle 23 will be displaced from its mid-position an amount proportional to the change in the thermocouple potential.

Periodically for increments of the time cycle of rotation of the shaft 31 proportional to the amount of displacement, the contact 24 will engage the needle 23 and there will be impressed on the grid 40 a potential substantially equal to the potential of the cathode 42, whereby the device 18 will be rendered non-conducting. During the increment of time, therefore, that the needle is in engagement with the contact 24 for each cycle of the shaft 31, a pulsating direct current will be impressed on the armature of the motor 13, effecting rotation in a direction to increase the temperature at the thermocouple 4.

The motor 5 will likewise rotate during the same increment as the field 7 will be normally energized, whereas the field 6 will be substantially de-energized due to the relatively high impedance of the winding 48 of the saturable reactor related thereto. Rotation of the motor 5 will cause the contact arm 20A to move along the slide wire resistance 20 to decrease the potential impressed on the galvanometer by the current in the potentiometer to that impressed on the galvanometer by the thermocouple. When, through the movement of the contact arm 20A, these potentials are again in balance, the galvanometer needle 23 will be in the neutral position and there will be no further engagement between the needle and the contact 24 until there is a further decrease in the thermocouple potential.

Upon an increase in temperature of the furnace and corresponding increase in thermocouple potential, the galvanometer needle will be displaced from its mid-position toward the contact 25 an amount proportional to the change in potential, and will engage the contact 25 for increments of time proportional to the displacement. The resulting positioning of the motor 13 and of the motor 5 will be in the opposite direction to that just described, whereby the control valve 3 will be positioned for a decrease in the temperature of the furnace and the rotor 8 will position the indicator 9 to indicate an increase temperature. Likewise, the contact arm 20A will move in the opposite direction along the slide wire resistance 20.

The accuracy of a potentiometer may be materially affected through change in the potential drop across the slide wire resistance. It is desirable, then, to periodically standardize or compare the potential drop through the slide wire resistance with a standard drop or a differential of potential of known value. In this connection, I provide a constantly rotated cam 50 driven at proper speed through gearing 51 from the shaft 31. The gear ratio may be such that the cam 50 makes, say, one revolution in three or four hours, or of any desired speed.

In engagement with the cam surface 50 is one end of a switch bar 52, pivotally fastened to which are contact fingers 53, 54 and 55, each pivoted separately externally relative to the switch bar 52, in a manner such that reciprocation of the bar 52 through rotation of the cam 50 will cause a vertical reciprocation of one end of each of the contact fingers. Further carried by the switch bar 52 is a rigid arm 56. Such reciprocation will cause that end of each contact finger to move from one contact to another so that alternately certain circuits are close circuited and at alternate intervals other circuits are close circuited.

I illustrate in Fig. 1 the switch bar 52 in its lowermost travel position wherein the contact finger 53 connects the coil 49 with motor field 7, contact 54 connects the coil 48 with motor field 6, and contact finger 55 connects the galvanometer 21 with thermocouple 4. In its shown position, the contact finger 56 is not close circuiting any circuit.

Upon rotation of the cam 50 to a position 180° to that shown in the illustration, the just mentioned circuits are open circuited; contact finger 53 connects the coil 49 with the field 57 of an alternating current motor 58, contact arm 54 connects the coil 48 with the field 59 of the motor 58, contact finger 55 connects the galvanometer with a suitable resistance 60 and a standard cell 61; and the contact arm 56 short circuits the armature 13 to electrically lock the motor in position to prevent movement of the valve 3 during the standardizing operation.

The potential between the junction points 62 and 10A is then impressed on the galvanometer in opposition to the potential of the standard cell 61. If these potentials are of an unequal magnitude indicating that the proper current is not in the potentiometer circuit, the galvanometer needle will be displaced from the mid-position in one direction or the other, depending upon the potential preponderating. Under such a condition the galvanometer needle will engage either the contact 24 or 25 periodically for increments of time proportional to the amount of displacement. The motor 58 will be operated during such engagement to move a contact arm 63 along the resistance 22 to vary the current in the potentiometer circuit until a predetermined difference of potential exists between the junctions 62, 10A, when the opposed potentials impressed on the galvanometer needle will be equal in magnitude. By proper selection of gears 51 and cam 50, the switch members 53, 54, 55, 56 may engage the contacts uppermost on the drawing for standardization, for any desired number of oscillations of the scissors arms 26, 27 before re-engaging the contacts lowermost on the drawing for normal operation.

As is well known, the potential developed by a thermocouple is dependent not only upon the temperature to which the hot junction is exposed and which temperature it is desired to evaluate, but also upon the temperature of the cold junction. In order that the thermocouple potential impressed on the galvanometer in opposition to the potential due to the current in the potentiometer circuit may be proportional only to variations in the temperature surrounding the hot junction, it is necessary to compensate the thermocouple potential for variations in the cold junction temperature. In my improved device, I utilize a current conducting liquid, such as mercury, to shunt out an amount of resistance in the potentiometer circuit proportional to changes in temperature of the cold junction from a reference or calibration temperature.

Connected in the potentiometer circuit between the junction 10A and slide wire resistance 20 is a resistance wire 63A passing through a mercury thermometer 64. Usually I prefer to make the resistance wire 63A of manganin or other similar resistance wire having a negligible temperature coefficient. As is well known upon an increase in temperature the mercury will rise within the thermometer 64 an amount proportional to the increase in temperature, submerging a greater length of the wire 63A. Due to the relatively greater cross sectional area of the mercury, the resistance at that portion of the circuit composed of the mercury and submerged wire may be considered negligible. It is, therefore, evident that the linear expansion of the mercury, due to variations in temperature, will effect a variation of the resistance of the potentiometer circuit which, by proper calibration, may be made to exactly compensate for changes in the potential developed by the thermocouple due to variations in cold junction temperature. The resistance wire 63A is preferably placed in the potentiometer circuit as shown between the junction 10A and the slide wire resistance 20, inasmuch as variations in the fall of potential necessary to compensate for changes in the cold junction temperature may then be made so minute as to have no appreciable effect on the fall of potential through the slide wire resistance 20.

In general, in Fig. 1 I illustrate a positioning type of control; that is, for each temperature at the thermocouple 4 there is a definite positioning of opening of the valve 3. With such a control, the width of regulation, namely, the temperature variation for full range of valve positioning, may be reduced until substantially uniform temperature is maintained within the furnace. I further illustrate and have described in connection with Fig. 1, the simultaneous periodic utilization of an effect representative of temperature for advising the magnitude of the temperature and for control of the temperature, the periodicity being in the time cycle of rotation of cams 29, 30, 35.

In Fig. 2, generally, I indicate a similar furnace with pyrometer 4 sensitive to temperature therein and with fuel control valve 3 capable of being positioned to throttle or control the admission of fuel to the furnace. Herein I show, however, not simultaneous recording and control but alternate wherein a switching mechanism is periodically actuated to make the thermocouple 4 effective, first, to record and then to control, and so forth, alternately. Furthermore, I provide, according to Fig. 2, what I term a floating control tending to always maintain a constant predetermined temperature within the furnace, and I have arranged the circuit in such a manner that I may by hand adjust or change the value of the temperature which is to be maintained.

The parts depicted in Fig. 2, such as the furnace, the motor 13, the recording and indicating assembly and the feeler mechanism, which are all identical with those similar parts of Fig. 1, I designate by similar reference numerals.

For periodically switching the effect of the thermocouple 4 between recording and controlling, I show a continuously rotating cam 65 driven through gear 66 from the shaft 31 of the feeler mechanism, to periodically reciprocate a switch bar 67. To the switch bar are pivotally fastened contact arms 68, 69, 70, and 71, each fixedly pivoted at one end in a manner such that upon reciprocation of the switch bar 67, the free end of each of the contact arms will move from a lower shown terminal to an upper shown terminal. As illustrated in Fig. 2, the switch bar 67 is in its lowermost position of travel whereby the proper circuits are completed to make effective the pyrometer 4 through the feeler mechanism for recording the temperature of the furnace. When the cam 65 moves to a position wherein the switch bar 67 is in its uppermost position of reciprocation, circuits are completed for making the thermocouple 4 through the feeler mechanism effective for control of the valve 3.

To actuate the motor 5 for advising the value of temperature, I utilize thermionic discharge devices 72, 73 wherein I control the relation of potential between the grid and cathode of either device to make the device conducting or non-conducting, thereby varying the impedance of the primary of the related transformer 74 or 75 to result in a substantial de-energization of either the field 6 or the field 7 whereby unequal opposed torques on the rotor 8 allow the rotor to rotate in desired direction. I have explained this in detail relative to Fig. 1, and I have further explained, illustrated and claimed the particular features of this type of control in my co-pending application, Serial No. 605,267 previously referred to.

During alternate periods of time when the cam 65 has reciprocated the switch bar 67 to its uppermost travel position whereby the thermocouple 4 is effective through the feeler mechanism for positioning the valve 3, I utilize in such control positioning the thermionic discharge devices 76, 77. Control of these devices is had through varying the potential relation between the respective grid and cathode for making the device conducting or non-conducting, as previously explained. The devices oppositely connected in parallel with each other are in series with the armature 13 for impressing upon the armature 13 full wave alternating current when both devices are conducting, or pulsating direct current in desired direction when only one of the devices is conducting and for allowing rotation of the armature 13 in predetermined direction.

As so far described, the arrangement of Fig. 2 compares with that of Fig. 1 except that I alternately utilize one pair of thermionic discharge devices for the recording means and subsequently alternately utilize a second pair of discharge devices in connection with the control means. I have not shown herein any arrangement for periodically standardizing the potentiometer circuit as in Fig. 1, but it is to be understood that this may readily be added to the arrangement of Fig. 2, as will be clearly seen.

The arrangement of Fig. 1 and that so far described of Fig. 2 is such that upon a departure of temperature within the furnace from a previous temperature an unbalance will occur in potential relation of the thermocouple circuit whereupon the feeler mechanism and amplifying means will cause a positioning along a slide wire resistance to bring the potential relation to a balance. The new position of the slide wire contact arm when balance potential is obtained is an indication of the temperature and simultaneously movement may be effected in proper direction to control the temperature and tend to bring it back toward predetermined value or the control may be accomplished alternately and periodically relative to the indication. All change in indication or control is, therefore, accomplished responsive to a departure of temperature from a previous temperature. In the arrangement of Fig. 2, I additionally actuate the control responsive to a departure of temperature relative to a predetermined temperature desirably to be maintained.

To explain this in simpler language, I may say that the arrangement of Fig. 1 is such, for example, that stable conditions may exist with the temperature in the furnace at any value between 1500° F. and 1520° F. That is, conditions will stabilize with a certain fuel valve opening and a temperature of 1500° F., or they will become stable with a different fuel valve opening and a temperature of 1520° F. or at any intermediate point, there being a definite relation, however, between the range 1500-1520° F. and the full travel of the control valve. Such relationship may be varied through adjustment wherein width of regulation, namely, 1500-1520° F. for full movement of the valve, may be widened or narrowed, and as such range is narrowed, conditions approach the maintenance of a constant predetermined temperature. However, such condition can never be attained for it would mean an on-off or wide open-tight closed control of the fuel valve rather than a throttling control.

With the arrangement of Fig. 1, if the temperature has been stable at 1500° F. and through some outside cause departs to 1502° F., this change in temperature effective upon the thermocouple 4 results in an unbalanced potential in the thermocouple circuit and as described the slide wire resistance 20 will be re-proportioned in the potentiometer and thermocouple circuits with simultaneous variation in indication of temperature and of control of the furnace. Thus, the action of the complete apparatus is in accordance with a departure in magnitude of temperature from a previous magnitude and the variation in indication and control is proportional to the extent of the departure.

In the arrangement of Fig. 2, I additionally arrange that the control alone be positioned responsive to the departure in magnitude of the temperature from the predetermined standard temperature. Thus, if at a certain time the temperature within the furnace is 1504° F. and then varies to 1506° F., the departure in magnitude from a condition of balance to a new condition is 2° F. while the departure in magnitude of the last temperature from predetermined temperature is 6° F. I utilize the departure having a magnitude of 2° F. to actuate the indicating means to advise the latest temperature and I utilize it in the next time cycle of the switch bar 67 to actuate the control motor 13 and I further actuate the control motor 13 in accordance with the value 6° F., departure from predetermined temperature, namely, 1500° F.

To accomplish this I connect in the circuit additional slide wire resistances 78, 79 proportioned as to their effective value in the circuit according to the magnitude of temperature deviation from predetermined standard, and by having inserted in the circuit, thus, a bias or unbalance of potential representative of the magnitude of departure from predetermined temperature, I do not allow the circuit potential to come to a balance until this biasing unbalance has been satisfied and the temperature has been returned to the standard or desired temperature. Thus, it will be seen that the unbalance of potential after a deviation of temperature is between the thermocouple potential resulting from the 2° F. departure as well as the potential bias of the resistances 78, 79 for the 6° F. departure from predetermined standard; using the temperature stated in the example above.

The thermocouple potential will be impressed on the galvanometer in opposition to that due to the current in the potentiometer circuit as determined by the position of a contact arm 80 positioned with the valve 3 by the motor 13 and relative to the slide wire resistance 81. The resistances 78, 79 are connected in series with the resistance 81 and are proportioned in the circuit through the positioning relative thereto of contact arms 82, 83 insulated from each other but carried together in positioning by a motor 84 similar to the motor 5, and having opposed windings 85, 86. When the winding 85 is energized, the contact arms 82, 83 will move, for example, to cut into the circuit more of the resistance 78 and out of the circuit more of the resistance 79, while if the field 86 is energized the reverse action will take place.

Connected in series with the resistances 78, 79 and contact arms 82, 83 are contact arms 87, 88 adapted to be moved simultaneously relative to additional slide wire resistances 90, 89, respectively. I provide thereby a hand means of varying temperature standards to which the control is to function. The contact arms 87, 88 are carried together by a yoke 91, through which is screw threaded a screw 92 having a knurled or other handle for turning, whereby the yoke 91 moves along the screw. The yoke 91 carries a pointer cooperating with an index 93 which may be graduated in degrees F. representing the standard or desired temperature to be maintained at the thermocouple 4 in the furnace.

The slide wire resistance 81 is preferably proportioned to the potential generated by the thermocouple so that a relatively small range in temperature is effective for positioning the valve 3 from one extreme position to the other. In this way I obtain a large change in the rate of fuel feed for a unit change in temperature, to the end that the temperature within the furnace may be maintained with but slight deviation from the standard or desired temperature.

For actuating the motor 84, I provide a mercury switch 94 having three terminals, namely, one connected to the field 85, one to the field 86, and a neutral connected to the power source 15. If the mercury switch is tilted in one direction, circuit will be completed for energization of the field 85, while if it is tilted in the opposite direction, the field 86 will be energized.

The mercury switch 94 is carried by a fulcrumed arm 95 whose free end bears against a cam surface 96. The cam 96 is fastened by a set screw 97 to the indicator arm 9 of the measuring means so that the cam may be rotated relative to the pivot point on the arm 9 and held in desired position by the set screw 97. Carried by the cam is a pointer 98 adapted to cooperate with an index 99, the latter rigidly fixed to and carried by the arm 9.

When the pointer arm 9 reads on the index 10 and chart 11, the desired standard temperature, for example, 1500° F., the cam 96 and pointer 98 will be so located through the set screw 97 relative to the arm 9, that the pointer will indicate on the index 99 the temperature 1500° F. and the mercury switch 94 will be in a mid or neutral position wherein circuit is not closed between the neutral contact and the contact to either the field 85 or the field 86.

Upon a departure in temperature from the standard 1500° F. temperature, the new temperature will be indicated through the position of the arm 9 and simultaneously cam 96 will have been moved relative to the arm 95 for tilting the mercury switch 94 to cause an energization of the field 85 or the field 86 whereupon the motor 84 will position the contact arms 82, 83 for inserting in the potentiometer circuit a proportion of the resistances 78, 79 for biasing the circuit to advise the magnitude of the departure of temperature from the predetermined standard temperature.

During those periods of time as determined by the cam 65 and switch bar 67 when thermocouple 4 is effective for positioning the motor 5, the mercury switch 94 will be positioned corresponding to magnitude of existing temperature. During the same periods of time, as well as the alternate periods of time, the mercury switch will be effective for control of the motor 84 so that the motor 84 may be positioned regardless of whether at that instant the thermocouple 4 is effective for measuring or for control. The neutral connection to the mercury switch 94, however, is connected through an interrupting switch 100 driven at a uniform reciprocation by the cam 101 geared to the shaft 31. Such periodic interruption of the circuit to the motor 84 allows for change in the temperature of the furnace in corresponding change in position of the parts 9, 96, 94 to prevent serious overtravel or hunting.

The unit resistance of the slide wire resistances 89, 90 is relatively great compared to the unit resistance of the slide wire 81 so that by moving the contact arms 87, 88 from one extreme position to the other along the related resistances, the potential due to the current in the potentiometer circuit will be varied an amount equivalent to the potentials generated by the thermocouple over the entire range of predetermined temperatures it may be desired to maintain within the furnace. If it is desired to change the predetermined or standard furnace temperature to which the control is to work, it is only necessary for the operator to turn the screw thread 92 until the pointer of the yoke 91 is adjacent the graduation on the index 93 representing the new desired standard temperature. This operation will so vary the potential impressed on the galvanometer by the potentiometer circuit through the resistances 89, 90 that the galvanometer needle will be displaced from its mid-position, effecting a change in position of valve 3 to bring the temperature to the desired new value, when the thermocouple potential will again be equal to that impressed on the galvanometer by the potentiometer current and the galvanometer needle will again be in its mid-position. Thereafter, slight deviations in the furnace temperature will effect relatively large movements of the valve 3 through a balancing of the resistances 81, 78, 79. It is, of course, essential that if a new temperature standard is set up through the hand adjustment 92, the set screw 97 be loosened and the cam 96 and pointer 98 be moved until the pointer 98 reads the same temperature on the index 99 when the pointer arm 9 reads the corresponding temperature on the index 10.

In control systems of the present character, in order that the temperature within the furnace may be maintained within certain limits of a desired temperature, and that upon departure from desired temperature the control act speedily enough to return the temperature without undue lag, it is usually desirable to have the valve 3 move from one extreme position to the other through a considerably smaller range in temperature than the range of the index 10. When such is desired, it is necessary, however, in order to protect the valve 3 and its motor 13 from injury through the motor urging the valve beyond its maximum open or closed position, to prevent de-energization of one or the other of the fields, whichever would tend to operate the motor to move the valve beyond the extreme open or closed position. It is further desirable to render the galvanometer 21 less sensitive to the differences in potential impressed upon it by the current in the potentiometer circuit and the thermocouple so that the galvanometer needle 23 will not be injured by striking hard against the contacts 24, 25.

I show in Fig. 2 a limit to the travel of the valve 3 through breaking a circuit at predetermined points in the valve travel which prevents other than the normal potential relation existing between the grid and cathode of the discharge device, which upon being rendered non-conducting would effect rotation of the motor to carry the valve past an extreme position. I render the galvanometer less sensitive to the differences in potential impressed upon it by connecting in series with the thermocouple at the same predetermined point in valve travel, a suitable resistance which, while not affecting the accuracy of the galvanometer, will decrease its rate of response to differences in potential so that the needle 23 will remain within desired limits of travel regardless of deviation of the actual temperature beyond the control range.

Positioned with the valve 3 is a cross-piece of the contact arm 80 insulated therefrom and which I designate at 102 adapted at one extreme of travel of the valve 3 to engage a pivoted spring-urged yoke 103, and at the other extreme of travel a similar yoke 104. When either of the yokes 103, 104 is engaged by an extension of the cross arm 102, the yoke is moved until certain circuits are opened, whereby the movement ceases and no further movement in the same direction of travel may be made.

The yoke 103 is adapted upon engagement of the arm 102 to break circuit, with contacts 105, 106 insulated from each other and from the yoke. Correspondingly, the yoke 104 is adapted to break contacts 107, 108.

Contacts 106, 107 control the making non-conducting of devices 76, 77 regardless of engagement between the contact needle 23 and contacts 24, 25. If, for example, contact 106 is opened through rotation of the motor 13 to an extent whereby 102 engages the yoke 103 and lifts same to open circuit the contact, then the corresponding device 76 is prevented from becoming non-conducting. It will be remembered that if the device 76 is non-conducting, the motor will rotate in a given direction. If the device 76 is prevented from becoming non-conducting, then the motor can be made to rotate only in a direction opposite to that which will result in an opening of contact 106 and regardless of the engagement of galvanometer needle 23 with contact 24. Correspondingly, should 102 cause an open circuiting of contact 107, the motor 13 will be allowed to rotate only in a direction opposite to that tending to open contact 107. Thus, the contacts 107, 106 provide limit switches for travel of the motor 13.

I have shown in the thermocouple lead to the contact arm 80 a resistance 109 normally short circuited by the contacts 105, 108 connected in series with each other. Should, however, the valve 3 reach an extreme position of travel in either direction, then either the contact 105 or the contact 108 will be open circuited, rendering effective the resistance 109. Thereafter, during the time period when the thermocouple is associated with the slide wire resistance 81, the current effecting displacement of the galvanometer needle 23 from its mid-position will be impeded by the resistance 109 sufficiently so that before the galvanometer needle has passed beyond desirable limits of travel it will be clamped between the bars 33, 34. While the resistance 109 serves to render the galvanometer less sensitive to differences in potential impressed upon it, the accuracy of the galvanometer will not be affected, and furthermore, as soon as the temperature within the furnace returns within the control range, closing the broken circuits 105 or 108, then the galvanometer will be restored to its normal sensitivity until there is a further variation in temperature beyond the control range.

Inherent characteristics of metallurgical furnaces similar to the one I have illustrated may vary widely, depending upon size, construction, method of firing and so forth. In some furnaces, to increase the rate of fuel feed a predetermined amount would effect a substantially instantaneous increase in the furnace temperature, whereas in other furnaces a considerable interval of time would elapse before a given change in the rate of fuel feed would affect the furnace temperature. A control system having for its object to maintain a predetermined temperature within the furnace, must take into consideration the rate of response of the particular furnace, otherwise a hunting condition will be set up causing the temperature to periodically go above or below the desired value. The rate of change of supply of fuel must, therefore, be established according to the rate of response of the furnace.

In order that the rate of response of a particular furnace may be satisfied to agree with the inherent characteristics of the furnace, I show a resistance 110 connected in series with a thermocouple, and the effectiveness of which may be varied by manual manipulation of the contact arm 111. The characteristics of the resistance 110 are similar to those of the resistance 109 in that it is effective for changing the responsiveness of the galvanometer to differences in the opposed potentials impressed upon it. If, for example, the time lag of the particular furnace to which the control system may be applied is negligible, the galvanometer may be made practically instantaneously responsive to differences in potential by moving the contact arm 111 counterclockwise to the extreme position, shunting out all of the resistance 110.

If, however, considerable time lag exists between a change in the rate of fuel supply and a variation in furnace temperature, any degree of responsiveness of the galvanometer may be obtained by rendering effective more or less of the resistance 110 through movement of the contact arm 111. Inasmuch as the galvanometer needle 23 is periodically at stated intervals of time clamped between the bars 33, 34, it is evident that its displacement from the mid-position at the instant it is clamped will not only be proportional to the difference in actual valve position from the desired position, but also to the amount of the resistance 110 rendered effective by the position of the contact arm 111, so that while periodically, and as described, the motor 13 will be operated to position the valve 3, the increment of time that the motor is operated and consequently the increments of motion of the valve will be less in proportion to the amount of resistance 110 effective. Eventually, however, the valve will open or close the same amount and change the rate of supply of fuel proportionally for a given change in temperature, regardless of the amount of resistance connected in the thermocouple lead.

While I have illustrated the invention as relating particularly to the measurement of temperature and the use of thermocouples, still I contemplate that the arrangement may be utilized for the measurement and control of other variables or characteristics in the operation of apparatus and which may be of a physical, chemical, thermal, electrical or other nature. Such variables might be flow, temperature, pressure or ratio of variables, and so forth.

While in the description and the appended claims for the sake of simplicity and clearness I have used the terms "slide wire resistance" and "slide wire potentiometer", it is to be understood that I include in this term any variable resistance capable of performing the same function.

Certain other types of feeler and amplifying mechanisms may be utilized, as well as electromagnetic means other than the motors I have shown. While I have illustrated and described certain preferred embodiments of my invention, it is to be understood that I am not to be limited thereby except as to the claims in view of prior art.

What I claim as new, and desire to secure by Letters Patent of the United States, is:—

1. In a temperature measuring and controlling apparatus, the combination of, a heating furnace, means for supplying an element of combustion to the furnace, regulating means for such supplying means, an indicator of the temperature of the furnace, an alternating current motor for positioning the indicator, a second motor having a separately excited direct current field and an armature connected in an alternating current circuit for positioning the regulating means, thermionic discharge devices for energizing the motors, and means responsive to temperature for controlling the thermionic discharge devices.

2. In a temperature regulator, the combination with a heated apparatus, of means for supplying heat thereto, regulating means for said heating means, a motor having an armature and a separately direct current excited field for operating said regulating means, a source of alternating current for energizing the armature, control means for said motor comprising two electron discharge devices, each having a grid, a cathode, and an anode, the output circuits of the electron discharge devices oppositely arranged in parallel and connected with said armature, means for maintaining a normal potential relation between said grid and cathode, and temperature sensitive means for changing such relation.

3. In a temperature regulator, the combination with a heated apparatus, of means for supplying heat thereto, regulating means for said heating means, a motor having an armature and a separately direct current excited field for operating said regulating means, a source of alternating current for energizing the armature, control means for the motor comprising two electron discharge devices, each having a grid, a cathode, and an anode, the output circuits of the electron discharge devices oppositely arranged in parallel and connected with the armature, means for maintaining a normal potential relation between said grid and cathode, and temperature sensitive means for periodically changing said relation for increments of time proportional to variations in the magnitude of the temperature of said apparatus.

4. In a temperature regulator, the combination with a heated apparatus, of means for supplying heat thereto, regulating means for said heating means, a source of alternating current for energizing said regulating means, control means for the regulating means comprising two electron discharge devices, each having a plate, a grid, and a cathode, the plates and cathodes of the devices oppositely connected in parallel and in series with said regulating means, means for maintaining a normal potential relation between the grids and cathodes of said devices, and means sensitive to the temperature of said heating apparatus for changing such relation.

5. In a temperature regulator, the combination with a heated apparatus, of means for supplying heat thereto, regulating means for said heating means, a motor having an armature and a separately direct current excited field for operating said regulating means, a source of alternating current for energizing the armature, control means for said motor comprising two electron discharge devices having input and output circuits, the output circuits of the devices oppositely connected in parallel and the armature of the motor connected in the output circuit; and means responsive to the temperature of said apparatus for controlling the energization of the input circuits.

6. In an apparatus for measuring and controlling the magnitude of a variable, the combination of means sensitive to variations in the magnitude of the variable, a pair of electron discharge devices each having a cathode, a grid and a plate, arranged oppositely in parallel, a motor having an armature and a separately direct current excited field, the armature of the motor connected in the plate circuits of said electron discharge devices, regulating means operated by said motor, an alternating current motor having opposed fields and connected in circuit with said electron discharge devices, a source of alternating current for energizing the armature of the first named motor and the opposed fields of the last named motor, means for maintaining a normal potential relation between the grids and cathodes of said electron discharge devices and means sensitive to variations in the magnitude of said variable for changing said relation.

7. The combination with a plurality of circuits, of a movable member, a plurality of electromagnetic windings for exerting opposed forces on said movable member, each of said windings connected in one of said circuits, a second plurality of circuits, a source of alternating current for energizing said first and second named plurality of circuits, means for controlling the current in said second named circuits, and a saturable core reactor coupling each of said first named circuits with one of said second named circuits.

8. The combination with a plurality of circuits, of a motor having a rotor and opposed windings, each of said windings connected in one of said circuits, a second plurality of circuits, a source of alternating current for energizing the first and second plurality of circuits, means for controlling the current in said second named circuits, and a saturable core reactor coupling each of said first named circuits with one of said second named circuits.

9. The combination with a galvanometer having a member adapted to be deflected in opposite directions, of a thermocouple, a potentiometer comprising a source of current and a slide wire resistance, a movable contact arm adapted to be positioned along the slide wire resistance, a connection from said contact arm to said thermocouple, a connection from the galvanometer to the thermocouple, a connection from the potentiometer circuit to the galvanometer, said thermocouple and potentiometer cooperating to control the galvanometer, a resistance connected in series with the thermocouple, a normally closed shunt circuit around said resistance and a switch member actuated by said contact arm at predetermined points in its travel to open said shunt circuit.

10. The combination with a potentiometer circuit comprising a source of current and a slide wire resistance, of a second resistance in said circuit and means sensitive to an independent variable for short circuiting varying amounts of said last named resistance proportional to variations in the independent variable.

11. The combination with means for producing an electrical effect bearing a functional relation to the difference in magnitude of two independent variables, of a potentiometer for determining the magnitude of one of the independent variables comprising a source of potential, a slide wire resistance, a second resistance, and means for automatically varying the drop in potential through the last named resistance in accordance with variations in the magnitude of the other of said independent variables.

12. The combination with a thermocouple for producing a potential, of a potentiometer for measuring said potential comprising a current source, a slide wire resistance, a second resistance; and means for automatically short circuiting a portion of said last named resistance.

13. The combination with a thermocouple for producing a potential, of a potentiometer for measuring said potential comprising a current source, a slide wire resistance, and means for automatically compensating for variations in the cold junction temperature of said thermocouple, said last named means comprising a resistance and means for automatically short circuiting a portion of said last named resistance.

14. The combination with a thermocouple for producing a potential, of a potentiometer for measuring said potential comprising a current source, a slide wire resistance, and means for automatically compensating for variations in the temperature of the cold junction of said thermocouple, said last named means comprising a resistance and means for automatically short circuiting an amount of the last named resistance bearing a functional relation to changes in cold junction temperature.

15. The combination with a thermocouple for producing a potential, of a potentiometer for measuring the potential comprising a current source, a slide wire resistance, and means for automatically compensating for changes in the temperature of the cold junction of said thermocouple, said last named means comprising a resistance and means responsive to variations in temperature for automatically short circuiting portions of said resistance, the fall of potential through said resistance compensating for variations in temperature.

16. In an apparatus for measuring and controlling the magnitude of a variable, the combination of means sensitive to variations in magnitude of the variable, an electron discharge device electrically controlled thereby, means for regulating the magnitude of said variable controlled by the current in the output circuit of the electron discharge device, mechanism for advising the magnitude of said variable, a source of current for energizing said mechanism, and a saturable core reactor coupling the output circuit of said electron discharge device with the circuit of said mechanism.

17. In an apparatus for measuring and controlling the magnitude of the temperature within a heated apparatus, the combination of means sensitive to variations in temperature within said apparatus, an electron discharge device electrically controlled thereby, means for regulating the magnitude of the temperature controlled by the current in the output circuit of the electron discharge device, a device for advising the magnitude of the temperature, a source of current for energizing said device, and a saturable core reactor coupling the output circuit of said electron discharge device with the circuit of said device.

18. In a temperature measuring device, the combination of means sensitive to variations in temperature, an electric circuit, means under the control of said temperature sensitive means for regulating the current in said circuit, another circuit, electromagnetic means for operating said measuring device connected in said last-named circuit, and a saturable core reactor connecting said first and second-named circuits.

19. Control apparatus comprising a deflecting member, a direct-current motor having an armature and a separately excited field, an electric circuit for the armature of said motor, means cooperating with said deflecting member for normally energizing said circuit with alternating current, and for selectively energizing said circuit with direct-current in one direction, or with direct-current in the opposite direction periodically for increments of time proportional to the amount of deviation of said deflecting member from a given position.

20. The combination with a device having a condition to be controlled, of means responsive to said condition, an electron discharge device, regulating means for an agent supplied said device for producing or maintaining said condition controlled by the space current in said electron discharge device, another electron discharge device, indicating means controlled by the space current in said second-named electron discharge device, said first-named electron discharge device electrically controlled by said first-named means during alternate periods of time, and said second-named electron discharge device electrically controlled by said first-named means during periods succeeding such alternate periods.

21. The combination with a heated device of means responsive to the temperature thereof, an electron discharge device, regulating means for a heating element supplied said heated device controlled by the space current in said electron discharge device, another electron discharge device, indicating means controlled by the space current in said second-named electron discharge device, said first-named electron discharge device electrically controlled by said temperature responsive means during alternate periods of time, and said second-named electron discharge device controlled by said temperature responsive means during periods succeeding said alternate periods.

22. In combination, a heated device, a thermocouple responsive to the temperature within said device, automatic mechanism comprising a galvanometer having a movable member responsive to variations in the potential generated by said thermocouple and a periodically reciprocated arm adapted to engage said member for increments of time bearing a functional relation to the deflection of said member from a neutral position, an electron discharge device having an input and an output circuit, means connected in said output circuit for controlling an element of combustion to said furnace, a second electron discharge device having an input and an output circuit, an indicator connected in the output circuit of said second-named electron discharge device, and means whereby said automatic mechanism electrically controls the first-named electron discharge device during alternate periods of time, and electrically controls the second-named electron discharge device during periods succeeding each alternate period.

23. In combination with a heated device and means for supplying a heating element thereto, means for producing a potential representative of the temperature of said device, means for producing a potential representative of the rate of supply of said heating element to said device, means for regulating the rate of supply of said heating element, control means for said regulating means comprising an electric motor, a plurality of electron discharge devices, said motor controlled by the space current through said devices, an indicator, means for producing a potential representative of the position of said indicator, operating means for said indicator comprising an electric motor, a second plurality of electron discharge devices, said last-named motor controlled by the space current through said second plurality of electron discharge devices; and means for controlling, during alternate periods, the input circuits of said first-named electron discharge devices in accordance with the difference between the potential representative of the temperature of said device and the potential representative of the rate of supply of said heating element, and during periods succeeding said alternate periods controlling the input circuit of said second plurality of electron discharge devices in accordance with the difference between the potential representative of the temperature of said device and the potential representative of the position of said indicator.

24. In combination with a heated device and means for supplying a heating element thereto, means for producing a potential representative of the temperature of said device, means for producing a potential representative of the rate of supply of said heating element to said device, means for regulating the rate of supply of said heating element, control means for said regulating means comprising an electric motor, a plurality of electron discharge devices, said motor controlled by the space current through said devices, an indicator, means for producing a potential representative of the position of said indicator, operating means for said indicator comprising an electric motor, a second plurality of electron discharge devices, said last-named motor controlled by the space current through said second plurality of electron discharge devices, and means for controlling, during alternate periods of time, the input circuit of said first-named electron discharge devices in accordance with the difference between the potential representative of the temperature of said heated device and the potential representative of the rate of supply of said heating element modified in accordance with the temperature within said device, and during periods succeeding said alternate periods controlling the input circuit of said second plurality of electron discharge devices in accordance with the difference between the potential representative of the temperature of said device and the potential representative of the position of said indicator.

25. In combination with a heated device and means for supplying a heating element thereto, means for varying the supply of said heating element, regulating means for said last-named means comprising an electric motor, a plurality of electron discharge devices, said electric motor controlled by the space current through said electron discharge devices, means for electrically controlling said electron discharge devices to maintain a practically fixed ratio between the rate of supply of said heating element and the temperature of said heated device, and means for modifying the control of said electron discharge devices in accordance with the magnitude of said last-named temperature.

26. An apparatus for measuring the value of a variable, comprising in combination, an indicator of the variable, means sensitive to the value of the variable, an electric circuit, means under the control of said sensitive means for regulating the current in said circuit, another circuit, electromagnetic means for positioning said indicator and connected in said last named circuit, and a saturable core reactor connecting said first and second named circuits.

JOHN D. RYDER.